United States Patent [19]
Ono et al.

[11] Patent Number: 5,304,440
[45] Date of Patent: Apr. 19, 1994

[54] OPTICAL DISK

[75] Inventors: Masumi Ono; Atsushi Fukumoto; Kouichi Yasuda, all of Kanagawa, Japan

[73] Assignee: Sony Corporation, Tokyo, Japan

[21] Appl. No.: 951,844

[22] Filed: Sep. 28, 1992

[30] Foreign Application Priority Data

Sep. 27, 1991 [JP] Japan ................. 3-249511

[51] Int. Cl.$^5$ ............................................. G11B 7/24
[52] U.S. Cl. .................................... 430/21; 430/13; 430/495; 430/945
[58] Field of Search .......... 430/21, 13, 945, 495; 346/135.1

[56] References Cited

U.S. PATENT DOCUMENTS 4,668,549  5/1987  Lippits et al. ................. 428/65
4,940,618  7/1990  Hamada et al. ................. 428/64
5,171,618  12/1992  Suzuki ........................... 428/64

Primary Examiner—Charles L. Bowers, Jr.
Assistant Examiner—John A. McPherson
Attorney, Agent, or Firm—Hill, Steadman & Simpson

[57] ABSTRACT

An optical disk having a greatly improved recording density. The disk has a transparent substrate provided with phase pits. A layer of a phase changeable material is formed on the substrate. This phase changeable material is a chalcogen or chalcogenide such as $Sb_2Se_3$ or $Sb_2Te_3$. When reading light is directed onto the disk, a part of the layer of the phase changeable material is melted within the spot of the reading light beam, and the reflectivity changes and a phase pit is read through the melted part. After the reading, the melted portion recrystallizes.

8 Claims, 4 Drawing Sheets

OPTICAL DISK

FIELD OF THE INVENTION

The present invention relates to an optical disk from which information can be read by illumination of laser radiation and, more particularly, to an optical disk suitable for high-density recording of information.

BACKGROUND OF THE INVENTION

An optical disk such as a digital audio disk, i.e., a compact disk, or a video disk is fabricated by forming an aluminum reflective film on a transparent substrate and forming a protective film or the like on the reflective film. Optically readable information is stored in the substrate in the form of phase pits.

In such an optical disk, a reading light, typically in the form of a laser beam, is directed onto the surface of the optical disk to make it possible to detect a great reduction in the amount of reflected light at the pits due to diffraction of the light. Thus, information can be read from the disk, i.e., the original signal is reproduced.

In the above-described optical disk, the resolution at which the signal is reproduced is determined almost only by the wavelength $\lambda$ of the light emitted from the light source of the reading optical system and by the numerical aperture NA of the objective lens. When the period of the produced phase pits exceeds the diffraction limit $\lambda/2NA$, the original signal is reproduced well.

Therefore, in order to store information in such an optical disk at a higher density, it is necessary for the reading optical system to use a semiconductor laser emitting a shorter wavelength $\lambda$ of light as its light source and to increase the numerical aperture NA of the objective lens.

However, limitations are imposed on the shortening of the wavelength of the light source and on the increase in the numerical aperture of the objective lens. In particular, if the wavelength of the light source is shortened, the recording density can be increased by a factor of four at best at the present level of technique. If an attempt is made to increase the numerical aperture of the lens, then it is difficult to manufacture lenses having a small amount of aberration. Even if such a lens is obtained, the stability of the focus against vibration and skew of the disk deteriorates. Consequently, the present situation is that it is difficult to improve the recording density of optical disks drastically.

We have already proposed optical disks capable of offering resolutions exceeding the aforementioned limit imposed by the wavelength $\lambda$ of the light source or by the numerical aperture of the lens system in Japanese Patent applications Ser. Nos. 94452/1990 and 291773/1990. More specifically, the phase within the laser spot of the reading light is partially varied to change the reflectivity, thus permitting reproduction at an ultrahigh resolution.

SUMMARY OF THE INVENTION

It is an object of the present invention to provide an optical disk which permits reproduction of signal at an ultrahigh resolution, with a high C/N (S/N), and with improved reliability.

The novel optical disk utilizes the reflectivity variations caused by partial phase changes within the reading laser light spot as described above. The difference in reflectivity between each phase pit to be read and any other location is detected stably and reliably with a high C/N (S/N) without the need to initialize the phase condition. In this way, an ultrahigh resolution is accomplished.

Other objects and features of the invention will appear in the course of the description thereof which follows.

DETAILED DESCRIPTION OF THE INVENTION

Figure 1:
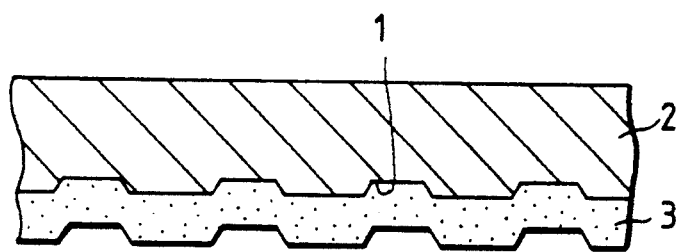
FIG. 1 is a schematic enlarged cross section of a main portion of an optical disk according to the invention.

Referring to FIG. 1, there is shown an optical disk embodying the concept of the present invention. This disk comprises a transparent substrate 2 provided with phase pits 1. That is, information that can be read out is stored in the transparent substrate 2. A layer 3 of a phase changeable material which can be crystallized after melting is formed on the substrate 2. When the reading light hits the phase changeable material layer 3, this layer partially changes into liquid phase within the spot of the laser light scanned, so that the reflectivity changes. After the reading, the liquefied region returns to a crystalline state. This region is hereinafter referred to as the melted-and-recrystallized region. The phase changeable material of the layer 3 consists of a chalcogen or a chalcogenide.

In this novel optical disk, the phase changeable material layer 3 is in a solid state, especially in a crystalline state, under normal or initial conditions. When information is read from the phase pits 1, i.e., when signals are played back, the high-temperature region produced within the scanned spot partially liquefies the phase changeable material layer 3, by utilizing the temperature distribution within the spot on the optical disk caused by the movement of the reading light relative to the disk. For example, the reflectivity of this liquefied region drops greatly. This makes it impossible to read the phase pits located within this region in liquid phase, by making use of diffraction. That is, a region is created within the reading light spot where phase spots are optically annihilated. Within this spot, only one, for example, of the phase pits can be read. In this manner, an ultrahigh-resolution reproduction that is not limited by the diffraction limit $\lambda/2NA$ is attained.

In this way, in accordance with the present invention, a phase shift between liquid phase and solid phase is exploited. The solid phase assumes a crystalline state in which there is increase the difference in reflectivity between the solid phase and the liquid phase. This crystalline state is produced in the melted-and-recrystallized region described above. In this region, it is assured that the liquid phase produced at the time of reading changes into a crystalline solid state. In this way, a crystalline condition is obtained with certainty under normal conditions without reacquiring any special thermal treatment process or cooling process and without the need to create this process, i.e., without providing initializing means.

After the phase changeable material layer 3 changes into a liquid phase by temperature elevation due to the illumination of the reading light, a cooling process takes place as the material cools subsequent to the passage of the light spot. We have discovered that during this cooling process, two kinds of liquid phase regions exist, depending on the selected phase changeable material, on the thickness of the layer, and on the manner in which the optical disk is fabricated. One kind forms the melted-and-recrystallized region. The other forms an amorphous region. The present invention is characterized in that when liquid phase is produced, this is caused in the aforementioned melted-and-recrystallized region. Thus, when the light spot shifts to other location, the liquefied portion crystallizes.

Figure 2:
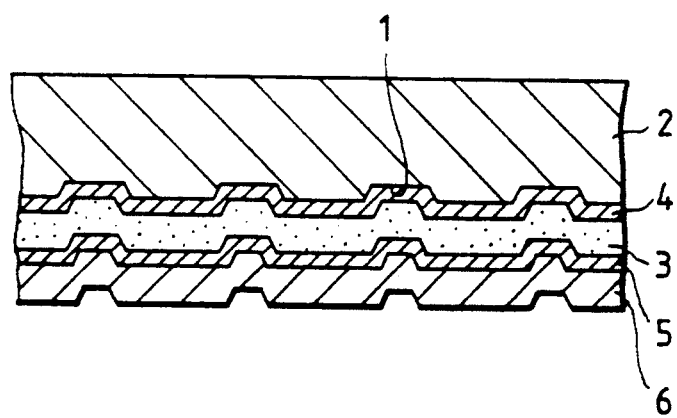
FIG. 2 is a schematic enlarged cross section of a main portion of another optical disk according to the invention.

In the structure shown in FIG. 1, the phase changeable material layer 3 is formed directly on the transparent substrate 2. Another example of optical disk according to the invention is shown in FIG. 2. The disk of FIG. 2 is fabricated by forming a first dielectric layer 4 on a transparent substrate 2 having phase pits 1, then forming a phase changeable material layer 3 on the first dielectric layer 4, forming a second dielectric layer 5 on the phase changeable material layer 3, and forming a reflective film 6 on the second dielectric layer 5. If necessary, a protective film (not shown) is formed on the reflective film 6. The optical characteristics such as the reflectivity can be set by the first and second dielectric layers, 4 and 5, respectively.

EXAMPLE 1

The structure shown in FIG. 2 was adopted. The transparent substrate 2 was made of a glass disk. To store information that can be read optically, phase pits 1 were formed in one face of the substrate. These pits 1 were so formed that the track pitch was 1.6 μm, the pit depth was about 1200 Å, and the pit width was 0.3 μm. The first dielectric film 4 having a thickness of 900 Å and consisting of AlN was deposited on one face of the transparent substrate 2. $Sb_2Se_3$ was deposited as a 400 Å-thick-phase changeable material layer 3 on the first dielectric film 4. Then, AlN was deposited as a 300 Å-thick-second dielectric layer 5 on the layer 3. Subsequently, an aluminum was deposited as 300 Å-thick-reflective film 6 on the second dielectric layer 5.

The following operations were performed on the specular portions of the optical disk of this Example 1 where no signal was recorded, i.e., the phase pits 1 were absent. Semiconductor laser radiation having a wavelength of 780 nm was focused at one point on the optical disk of this Example 1. Then, the disk was allowed to gradually cool to initialize it, i.e., to crystallize it. Then, pulsive laser radiation was caused to hit the same point while maintaining the laser power P within the range $0 < P \leq 10$ mW. The pulse duration t was set to the range 260 nsec $\leq t \leq 2.6$ μsec. If the reflectivity of the solid state after the cooling subsequent to the pulsive light illumination at ordinary temperature is different from the reflectivity of the solid state before the illumination, then it follows that the material has changed from a crystalline state to an amorphous state. Where no change in the reflectivity is observed, if the amount of returning light changes once during illumination of the pulsive light, then it follows that the film recrystallizes after it liquefies once. In this way, a portion of the film is once melted, i.e., changes into liquid phase. Then, the film portion recrystallizes as its temperature drops. This portion is herein referred to as the melted-and-recrystallized region.

Figure 3:
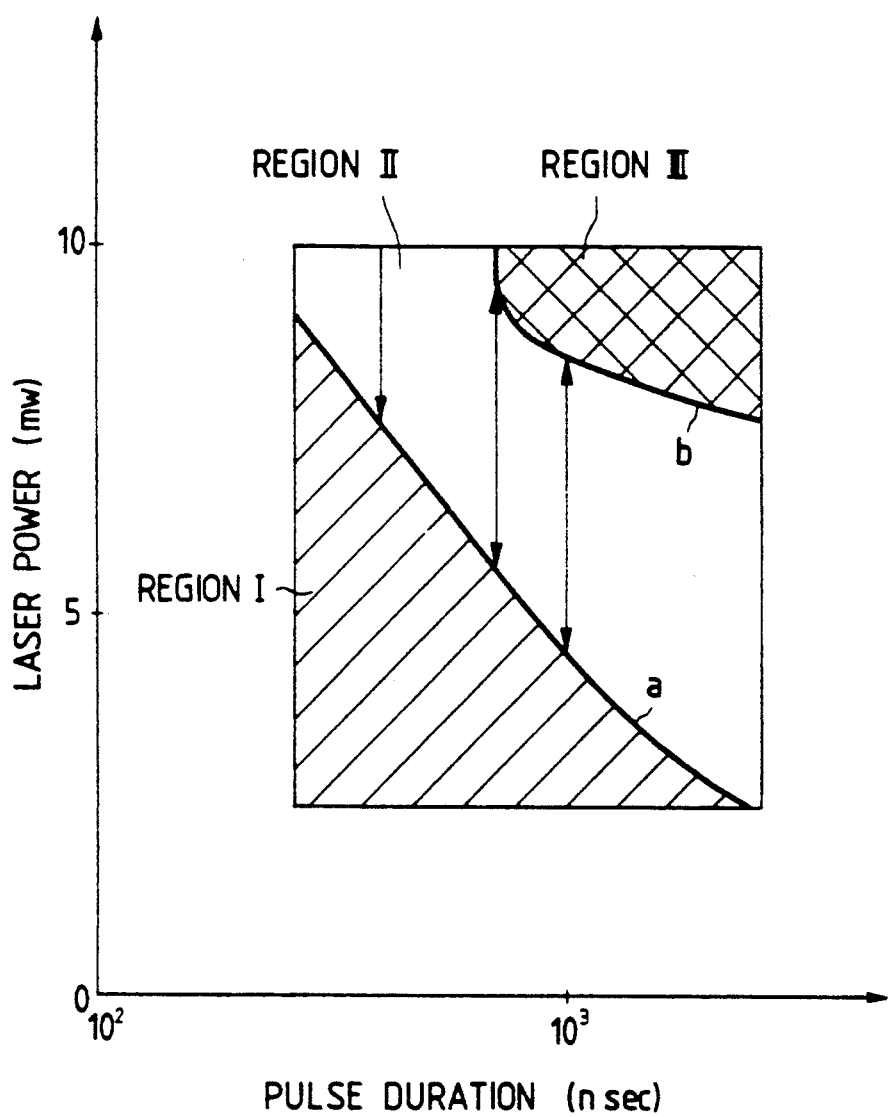
FIG. 3 is a diagram illustrating phase changes, for illustrating the principle of the invention.

In FIG. 3, the pulse duration and the power of the laser radiation directed to the optical disk of Example 1 are plotted on a horizontal axis and a vertical axis, respectively. The phase changeable material layer 3 of this disk is made of $Sb_2Se_3$. The phase changes of this layer 3 are also shown in FIG. 3. In a hatched region I located under the curve α, the phase changeable material layer 3 is not melted but maintained in its crystalline condition. In the region located above the curve α, the layer 3 changes into a liquid state, i.e., it is melted. In region II located between the curves α and β, the layer 3 recrystallizes when the layer 3 is allowed to cool after the laser radiation spot leaves. That is, this region II is the melted-and-recrystallized region. In crosshatched region III located above the curve β, the layer 3 is also melted by the illumination of the laser spot. However, when the radiation spot leaves and the layer is allowed to cool, it returns to an amorphous state. That is, this is the melted amorphous region.

In accordance with the present invention, the power of the reading light, the structure of the optical disk, the material of the disk, the thicknesses of various layers and other factors are so selected that during the cooling process between the end of the heating due to the reading light in the playback operation and the instant at which room temperature is reached, the time Δt between the instant at which the melted-and-recrystallized region II is heated to its melted point MP and the instant at which it solidifies is larger than the time tλ required for the recrystallization.

In Example 1, the reflectivity was 57% under initial, crystalline condition. In the melted condition, the reflectivity was 16%. The power of the reading light was 9 mW. The line velocity was set to 3 m/sec. When the signal was reproduced, the C/N was 25 dB.

EXAMPLE 2

Figure 4:
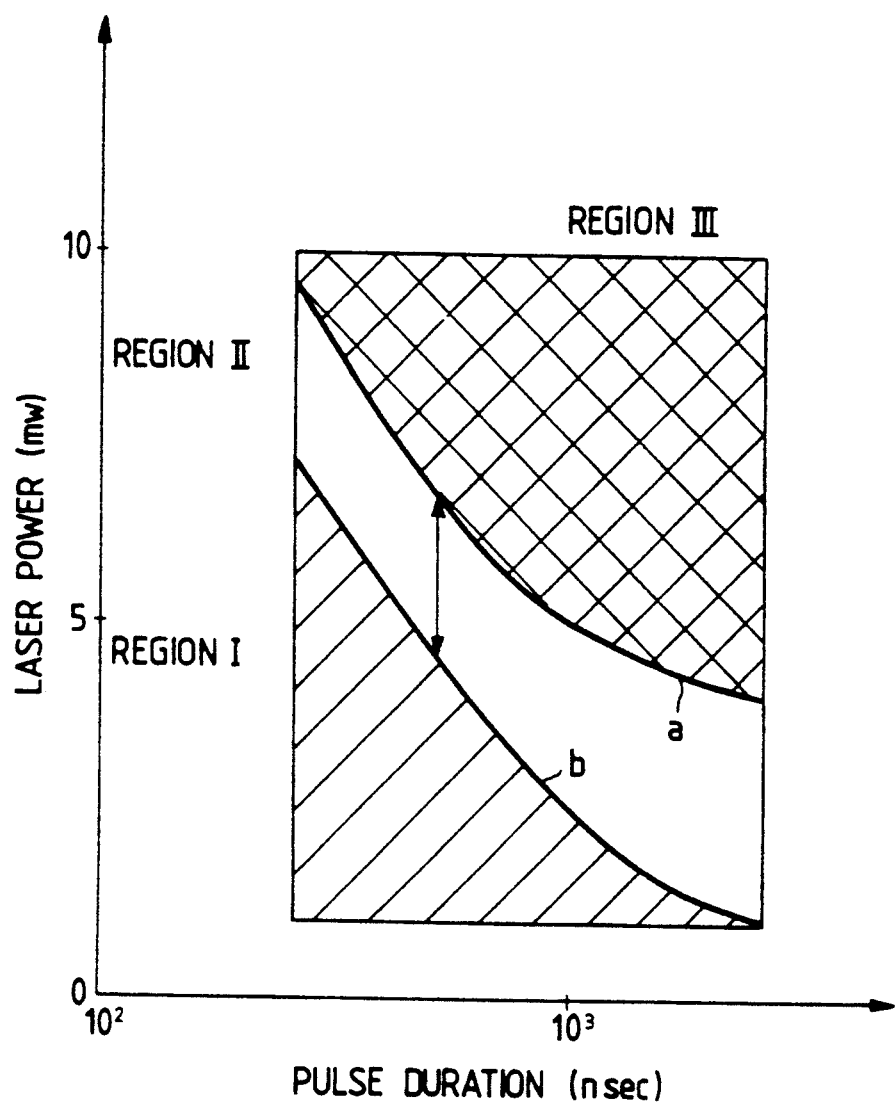
FIG. 4 is a diagram illustrating other phase changes, for illustrating the principle of the invention.

This example was similar in structure to Example 2 except that the phase changeable material layer 3 was made of $Sb_2Te_3$. The changes of the phase were measured in the same way as in FIG. 3. The results are shown in FIG. 4. Like components are indicated by like reference numerals in the various figures. Those components which have been already described in conjunction with FIG. 3 will not be described below. In this Example 2, the reflectivity was 20% under initial, crystalline conditions. In a melted state, the reflectivity was 10%.

Chalcogens and chalcogenides including $Sb_2Se_3$ and $Sb_2Te_3$ show substantially the same reflectivity whether they are in an amorphous state, or in a melted state.

Figure 5:
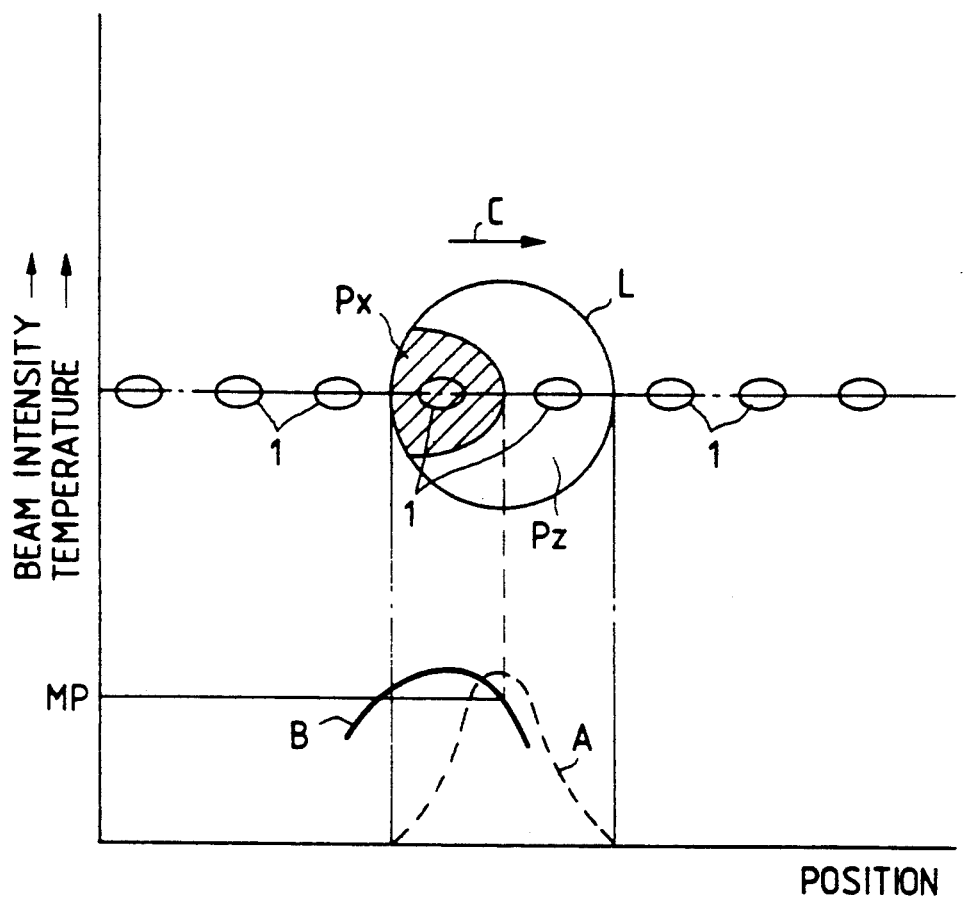
FIG. 5 is a diagram showing the relation between a laser beam spot and the temperature distribution across this spot, for illustrating the principle of the invention.

When the optical disk of Example 2 is played back, an ultrahigh resolution is obtained, utilizing the temperature distribution inside the scanning spot on the disk. The case in which a laser beam is made to impinge on the novel optical disk is now described by referring to FIG. 5. In FIG. 5, the horizontal axis indicates the position of the spot of the laser beam in the direction of scanning. It is now assumed that the illumination of the laser beam produces a laser spot L. The distribution of the light intensity is indicated by the broken line A. On the other hand, the temperature distribution in the phase changeable material layer 3 is indicated by the solid line B. It is to be noted that the temperature distribution inside the layer 3 is slightly delayed with respect to the light intensity distribution in the scanning direction of the spot L indicated by the arrow C, according to the scanning speed of the laser spot L.

It is assumed that the laser spot L is scanned in the direction indicated by the arrow C as mentioned above. The temperature of the optical disk rises gradually from the front end in the direction of movement of the laser spot L and exceeds the melting point MP of the material layer 3. At this stage, the phase changeable material layer 3 changes from its initial, crystalline state into a melted state. As a result, the reflectivity decreases. Therefore, two regions $P_X$ and $P_Z$ exist inside the laser beam spot L. In the hatched region $P_X$, the phase pit 1 can hardly be read. In the other region $P_Z$, the crystalline state is maintained. In this case, if two phase pits 1 are present inside the same spot L as shown, only one phase pit 1 existing in the region $P_Z$ exhibiting a larger reflectivity can be read. The other phase pit existing in the region $P_X$ having a quite small reflectivity cannot be read. In this way, if plural phase pits 1 exist in the same spot L, only a single pit 1 can be read. That is, it can be read at an ultrahigh resolution without being affected by the numerical aperture NA of the lens system or by the wavelength $\lambda$ of the reading light.

The transparent substrate 2 is not limited to the aforementioned glass disk. The substrate 2 can also be made of a synthetic resin such as polycarbonate or polymethacrylate. Also, a photopolymer may be deposited on this resinous substrate. The phase pits 1 may be formed by means of a stamper. In this way, the substrate 2 can take various forms.

The phase changeable material of the layer 3 is not limited to the above-described chalcogenides or chalcogen compounds such as $Sb_2Se_3$ or $Sb_2Te_3$. The layer 3 may also consist of other chalcogenide or chalcogen alone. Examples of chalcogen and chalcogenide include Se alone and Te alone. Usable chalcogenide materials are BiTe, BiSe, In-Se, In-Sb-Te, In-SbSe, In-Se-Tl, Ge-Te-Sb, and Ge-Te. Where the phase changeable material layer 3 is made of such a chalcogen or chalcogenide, the characteristics such as the thermal conductivity and specific heat can be made preferable for the formation of the temperature distribution which is desirable for the reading light consisting of semiconductor laser radiation. Hence, a melted condition can be created well in the melted-and-recrystallized region described above. In consequence, playback can be effected at an ultrahigh resolution at a high S/N or C/N.

The material of the first dielectric film 4 and of the second dielectric film 5 can be $Si_3N_4$, SiO, $Al_2O_3$, ZnS, $MgF_2$, as well as the aforementioned AlN. The material of the reflective film 6 can be Cu, Ag, Au,a as well as the aforementioned Al.

In the examples described above, the various conditions such as the layer thickness are so set that the reflectivity is low when the phase changeable material layer 3 is in a melted state and high when the layer 3 is in a crystalline state. The various conditions including the structures of the various layers, the thicknesses, the constituents of the phase changeable material, and its thickness can be set in such a way that the reflectivity is high when the layer 3 is in a melted state and low when the layer 3 is in a crystalline state. In this case, only one phase pit 1 is located in the high-temperature region $P_X$ inside the laser beam spot L described in connection with FIG. 5. Only the single phase pit 1 present in this region PX can be read.

As described above, the present invention is also based on the principle that different temperature regions within the reading light spot result in different reflectivities. Only certain phase pits in the light spot can be read. This enables reading at an ultrahigh resolution. The present invention is characterized in that both a crystalline state and a melted state are utilized to produce a large difference in reflectivity. Hence, playback can be effected at a high S/N or C/N. In the melted condition, the melted-and-recrystallized region is changed into a liquid phase. Therefore, after the reading, the region is initialized without the need to adopt any initializing operation or means. In this way, where the novel optical disk is used, the reading apparatus and the reading operation are simplified.

What is claimed is:

1. An optical disk, comprising:

a transparent substrate having stored therein optically readable information in the form of phase pits; and a layer of phase changeable material overlying the phase pits, the phase changeable material capable of being melted upon illumination by a suitable light source and crystallizing after such melting, such that a portion of said phase changeable material illuminated by said light source exhibits a lower reflectivity than a surrounding area thereby to allow a phase pit underlying said illuminated portions to be read therethrough.

2. An optical disk comprising:

a transparent substrate in which optically readable information is stored in the form of phase pits;

a first dielectric film formed on the transparent substrate;

a layer of phase changeable material which is formed on the first dielectric film and overlying the phase pits, the phase changeable material capable of being melted upon illumination by a suitable light source and crystallizing after such melting, such that a portion of said phase changeable material illuminated by said light source exhibits a lower reflectivity than a surrounding area thereby to allow a phase pit underlying said illuminated portions to be read therethrough;

a second dielectric layer formed on the layer of the phase changeable material;

a reflective film formed on the second dielectric layer.

3. The optical disk of claims 1, wherein said phase changeable material is a chalcogen or chalcogenide.

4. The optical disk of claim 1, wherein a power P of the light source satisfies the relation $0 < p \leq 10$ mW.

5. The optical disk of claim 1, wherein said light source has a duration t that satisfies the relation $260 \text{ nsec} \leq t \leq 2.6 \text{ } \mu\text{sec}$.

6. The optical disk of claim 1, wherein said phase changeable material is selected from the group consisting of $Sb_2Se_3$, $Sb_2Te_3$, Se, Te, BiTe, BiSe, In-Se, In-Sb-Te, In-SbSe, In-Se-Tl, Ge-Te-Sb, and Ge-Te.

7. The optical disk of claim 2, wherein said first dielectric film and said second dielectric film comprise at least one material selected from the group consisting of AlN, $Si_3N_4$, $SiO_2$, $Al_2O_3$, ZnS, and $MgF_2$.

8. The optical disk of claim 2, wherein said reflective film comprises at least one material selected from the group consisting of Al, Cu Ag, and Au.

* * * * *